UNITED STATES PATENT OFFICE 2,440,168

MEAT PRODUCT AND PROCESS OF MAKING THE SAME

George L. Cross, Loudonville, N. Y., assignor to Tobin Packing Co., Inc., Albany, N. Y.

No Drawing. Application December 8, 1944, Serial No. 567,311

4 Claims. (Cl. 99—108)

This invention relates to an improved meat product and to the process of making the same.

This application is a continuation in part of my pending application, Serial No. 426,049, filed January 8, 1942, which is now abandoned.

It is an object of the present invention to provide an improved meat product which is tender, has an attractive flavor, and possesses many of the characteristics of the more expensive grades and cuts of meat, but which, nevertheless, may be produced from some of the less expensive cuts of meat.

Heretofore, meat products which are comparatively tender, have been made from the less expensive cuts of meat by compressing pieces of the meat in a mold, chilling or freezing the meat, and thereafter slicing the meat into wafer-thin slices. Several slices are then super-imposed one upon the other so as to produce a meat product generally referred to as a steak. While these products are tender, they have several disadvantages and defects, namely, the flavor of the products is not comparable with the better cuts of meat, the products are frequently quite difficult to cook, particularly to fry, and the several slices forming each product frequently separate when defrosted and also in the process of cooking.

It is an object of the present invention to overcome the disadvantages and defects, as outlined above, and to provide an improved meat product and process of making the same wherein the product is not only tender, but also has a flavor comparable with the flavor of the better cuts of meat and, furthermore, is relatively easy to cook and will remain in one piece when defrosted and also when cooked.

A further object of the present invention is to provide an improved meat product which will have the appearance of a prime beef where the product is made of beef.

Other objects will be apparent from the following detailed description of my invention.

In carrying out my invention, I first provide lean muscle tissue meat which may be either beef, veal, lamb or pork. While my process may be used with any meat for the purposes of clarity and in order to illustrate my invention the following examples are based on results obtained by using beef. The meat is first boned, and the sinews and tendons are preferably removed therefrom. After the removal of the bones, sinews and tendons, the meat is then divided into relatively small pieces as by passing it through a coarse meat grinder. The size of the pieces may vary considerably. However, I prefer to employ pieces varying in size from a minimum dimension of approximately one-half of an inch to a maximum dimension of approximately two inches.

I then provide additional muscle tissue meat which is boned and then finely divided or comminuted into very small particles so as to provide a colloid-like meat preparation having a consistency similar to that of a thick paste. This preparation may be formed by passing the meat through a fine grinder and thereafter chopping it in a sausage cutter or other chopping machine, until the particles are very small and the meat is in an emulsified form.

The boning, grinding and chopping operations heretofore described are preferably carried on at a low room temperature varying from between approximately 35° to 50° F. In this connection, in the making of the colloid-like meat preparation, I have found it desirable to mix a small quantity of cold water or ice with the meat during the grinding and chopping operations so as to prevent overheating of the meat, since I have found that overheating produces certain undesirable results, such as weakening or destroying the adhesive characteristics thereof and also tends to destroy the fresh, bright color. The colloid-like meat preparation serves as a binder and will be so referred to from time to time in this application, and accordingly it is important to preserve the adhesive characteristics thereof.

I then take the cod or other fat, which is first thoroughly chilled, and grind it through a ⅛-inch grinder plate or chop it in a Roto-cut or other cutting equipment to equivalent size. Preferably, the fat during the cutting should be kept at a temperature of 36° to 45° F. and care should be exercised during cutting to prevent the oils and fibers from separating. After the fat is cut to proper sizes, it is spread in shallow containers and allowed to temper in a room from 90° to 120° F. until the particles are thoroughly softened. The particles should be stirred or agitated sufficiently to keep the oils in suspension and provide uniform temperature throughout mass. When they have reached a plastic-like stage, water up to 100% of the weight of the fat may be added to bring the mass to a fluid or emulsified stage, but the water however, must be added with care to prevent the oils and fibers in the fat from separating.

While good results may be obtained by having the fats as low as 62° F. and the water as high as 136° F., best results are secured when the fat particles are kept at 90° F. and the water temperature about 116° F., and the mixture made in a room at a temperature of 96° F.

As soon as the fat is emulsified, it should be thoroughly mixed with the particles of meat prepared as heretofore described.

The proportion in which it may be mixed together is not critical and may be varied considerably.

A natural appearing steak has been produced by combining 78% well trimmed lean beef with 20% of the fat emulsion. If desired, 1% butter and 1% of flavoring—such as onions—may be added. The mass is formed in molds or stuffed into a suitable tubing or casing, quick frozen, at temperatures from 15° to 40° F. below zero. Remove from molds, temper until an average temperature of about 28° F. is attained and slice into steaks of required thickness.

As a further example, a so-called roast can be prepared by combining 90% lean tough beef cut into pieces of approximately 7/32-inch diameter with 10% fat emulsion. The mass is placed in forms, quick frozen, allowed to temper slightly and is then ready for roasting in a normal manner.

Another method employed to produce a tasty, tender and natural appearing steak is to combine 85% lean beef from which all sinews are removed, with 5% finely chopped beef of a coarse or stringy nature, and 10% fat emulsion, prepared as previously stated—the combined ingredients then thoroughly mixed and formed into a tubing or mold of desired shape or size, then quick frozen. After freezing remove from molds, temper out to about 28° F. and slice in desired thickness or slice into very thin slices placing a multiple of slices together until steaks of a desired thickness are attained.

The foregoing, of course, are only examples and it is possible to make many combinations, for instance, chicken fat can be emulsified and blended with lean pork or veal, flavoring ingredients added to bring out a chicken-like flavor.

Because of the novel way in which the fat is added, the forms of frozen meat may be sliced at a relatively lower temperature than the lean meat itself can be sliced. Fat added in this manner also makes it possible to bring appearance and flavor to dry and tough pieces of meat, creating a consumer demand for cuts of meat that have always been less desirable and therefore sold for very low prices.

I claim:
1. A process of preparing a meat product which comprises first dividing a quantity of lean muscle tissue into relatively small pieces, dividing a second quantity of muscle tissue into very small particles so as to form a colloid-like binder, thereafter mixing together the pieces of meat and the binder and blending therewith a small quantity of emulsified fat and pressing the mixture into a mold and freezing it solidly throughout, then removing the preparation from the mold and cutting the meat into slices.

2. A meat product composed of muscle tissue cut into small pieces and mixed with an emulsified fat, the mass being frozen and pressed into a solid piece with the fat so distributed as to give the product the marbled appearance found only in the better cuts and grades of beef.

3. A method of preparing a meat product which comprises dividing a quantity of muscle tissue into relatively small pieces, dividing a second quantity of muscle tissue into very small particles at temperatures below 50° F., cutting fat into small particles and tempering it at approximately 90° to 120° F. and mixing said fat with water at temperatures of approximately 116° F. to form an emulsion, then mixing the meat and the emulsion, forming the mass in molds, quick freezing it, then slicing the product.

4. A meat product composed of muscle tissue cut into small pieces and mixed with an emulsified fat to give the appearance and flavor of prime quality meat, the mass being frozen and pressed into a solid piece.

GEO. L. CROSS.

REFERENCES CITED

The following references are of record in the file of this patent:

UNITED STATES PATENTS

| Number | Name | Date |
|---|---|---|
| 2,203,318 | Yerk | June 4, 1940 |
| 2,052,221 | Dubil | Aug. 25, 1936 |
| 2,179,676 | Vogt | Nov. 14, 1939 |
| 1,503,864 | Vogt | Aug. 5, 1924 |
| 1,558,069 | Williams | Oct. 20, 1925 |
| 1,852,259 | Parsons | Apr. 5, 1932 |
| 2,288,244 | Komarik | June 30, 1942 |
| 2,035,899 | Kraft | Mar. 31, 1936 |